United States Patent [19]
Falcey

[11] Patent Number: 5,992,108
[45] Date of Patent: Nov. 30, 1999

[54] MODULAR ACCESS FLOOR SYSTEM

[76] Inventor: Mark Masao Falcey, 2115 Ala Wai Blvd., No. 1501, Honolulu, Hi. 96815

[21] Appl. No.: 09/045,282

[22] Filed: Mar. 20, 1998

Related U.S. Application Data

[60] Provisional application No. 60/041,163, Mar. 20, 1997.
[51] Int. Cl.$^6$ .............................. E04B 5/43; E04B 5/48
[52] U.S. Cl. ................. 52/220.2; 52/126.6; 52/126.7; 52/220.3; 52/220.8; 52/234; 52/263; 52/505; 52/592.1; 52/592.6; 52/607
[58] Field of Search ................. 52/220.2, 220.3, 52/220.8, 126.5, 126.6, 126.7, 607, 505, 234, 263, 592.1, 592.6

[56] References Cited

U.S. PATENT DOCUMENTS

| | | | |
|---|---|---|---|
| 5,263,289 | 11/1993 | Boyd | 52/220.3 X |
| 5,434,355 | 7/1995 | Sho | 52/220.3 X |
| 5,904,015 | 5/1999 | Chen | 52/220.2 |

Primary Examiner—Christopher T. Kent
Attorney, Agent, or Firm—Martin E. Hsia

[57] ABSTRACT

A modular floor access panel having at least one fully enclosed access channel and a vertically extending service well intersecting with the access channel, with an interlocking structure on the periphery allowing secure attachment to adjacent panels. Preferably the interlocking structure is integrally formed with the panel. Optionally, the panel may be provided with a leveling mechanism and the service well is configured to receive decentralized facilities.

18 Claims, 12 Drawing Sheets

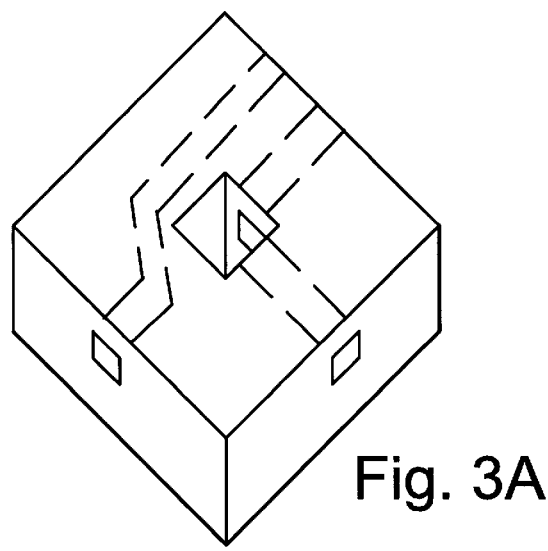
Fig. 3A
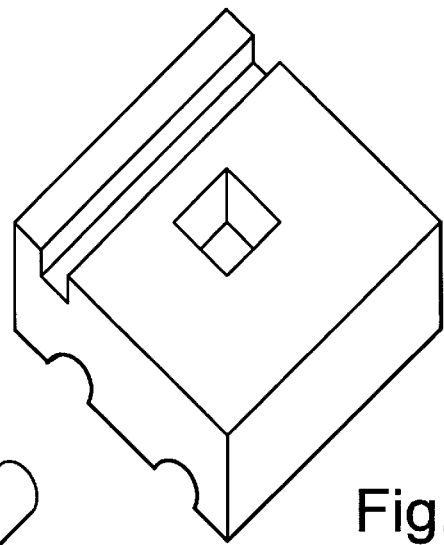
Fig. 3B
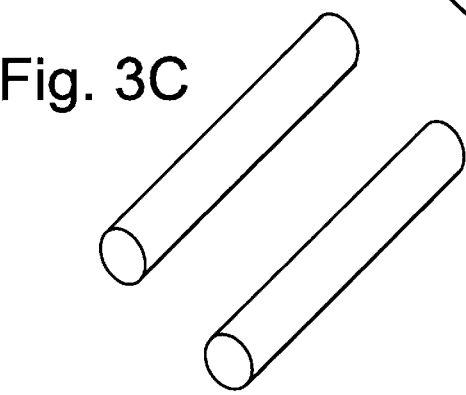
Fig. 3C
Fig. 3D
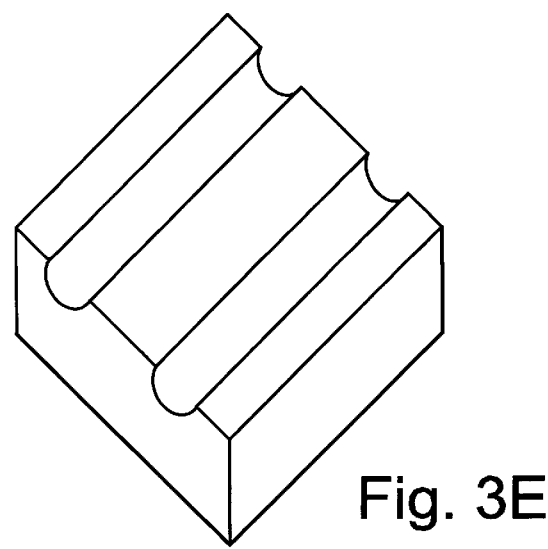
Fig. 3E

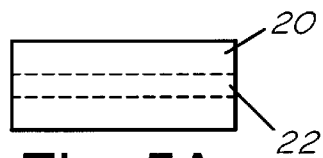
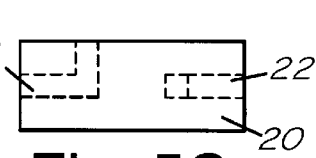
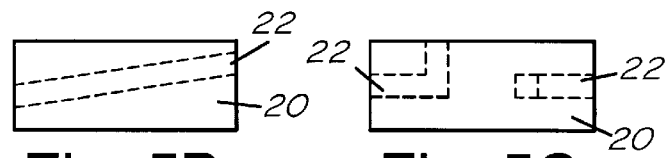
Fig. 5A  Fig. 5B  Fig. 5C
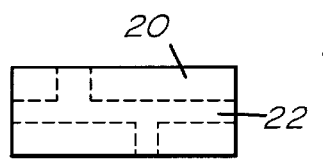 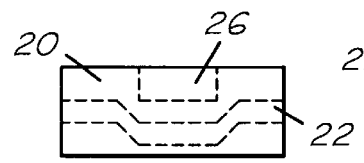 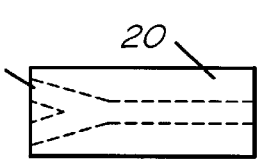
Fig. 5D  Fig. 5E  Fig. 5F
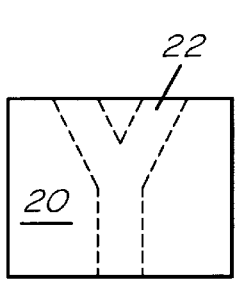 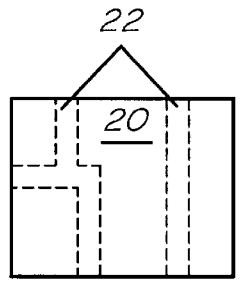 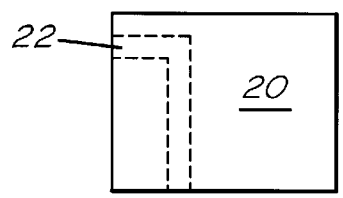
Fig. 6A  Fig. 6B  Fig. 6C
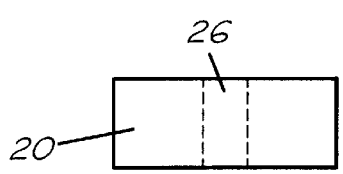 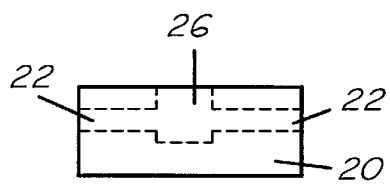
Fig. 7A  Fig. 7B
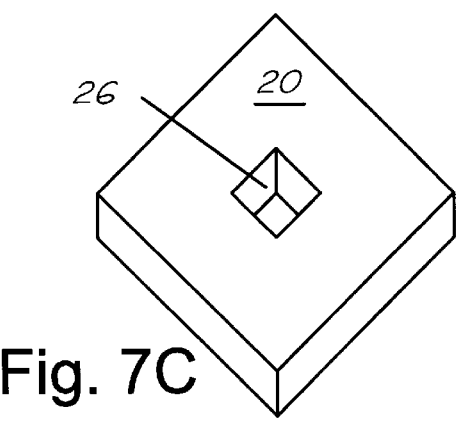 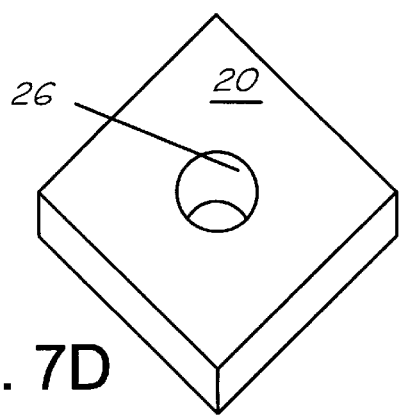
Fig. 7C  Fig. 7D Fig. 14
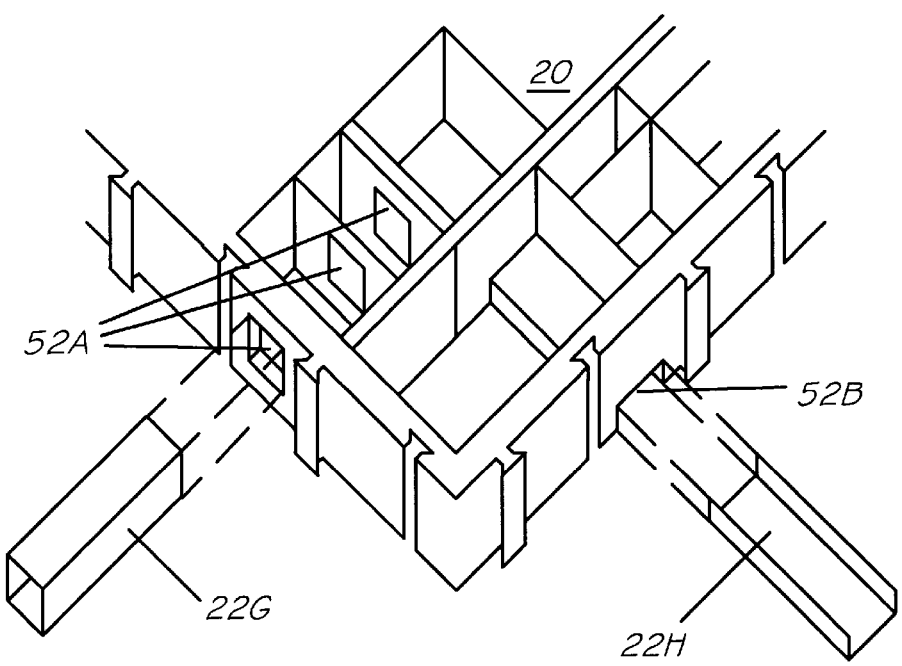
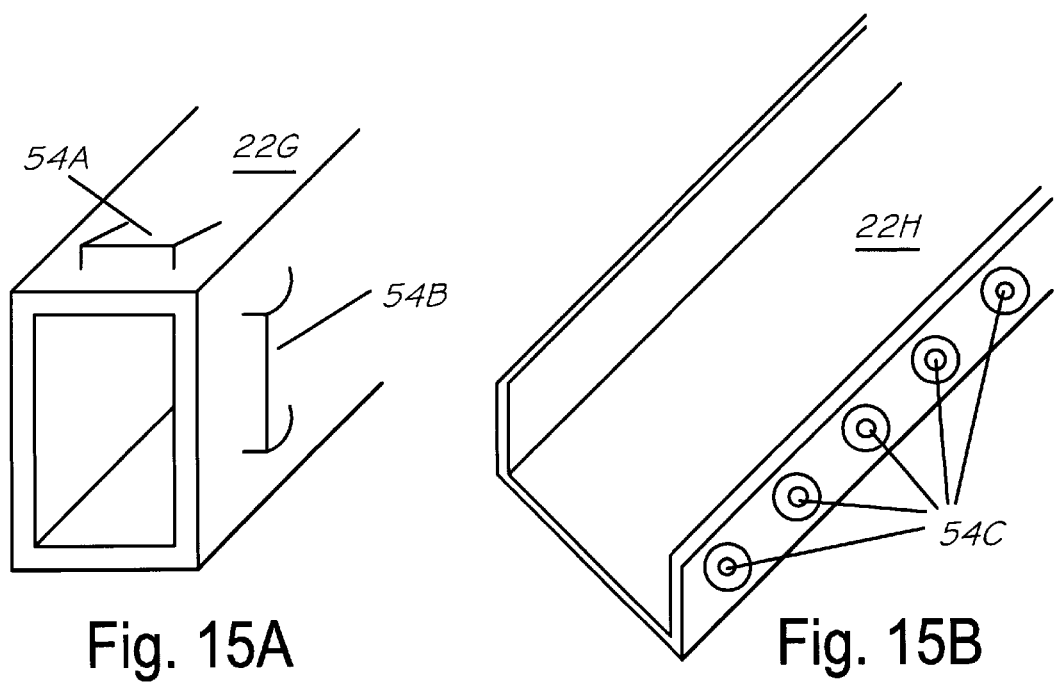
Fig. 15A  Fig. 15B

MODULAR ACCESS FLOOR SYSTEM

This application claims the benefit of U.S. provisional application No. 60/041,163 filed Mar. 20, 1997.

FIELD OF THE INVENTION

The present invention relates to the distribution of utilities between a floor and sub floor and more particularly to the use of prefabricated modular panels and methods of construction of such panels.

BACKGROUND OF THE INVENTION

In the United States and abroad it is current practice to install wiring, piping, ventilation and other utilities in a plenum or space above a false ceiling. This is time consuming and tedious work. As a result, workers are required to spend many hours standing on ladders or putting up staging in order to install said utilities and the hangers and wire ways needed to support such utilities. In order to overcome these expensive and laborious installations, various access floor systems have been developed.

Access floor systems generally include panels, blocks, or tray type assemblies that cover, hold, and direct the wires, ducts, and pipes that are used to deliver utilities. In addition, many such systems are constructed by the assembly of various types of individual posts, beams, brackets, and leveling systems that are used to support a top floor and to provide a space between a sub-floor and said top floor. U.S. Pat. No. 5,477,649 to Bessert is an example of one such style of construction using adjustable pedestals to support a top floor and also to support conduits and piping. U.S. Pat. No. 5,090,169 to Takeda et al. is typical of many other such systems currently in use in which plinths or pillars are used to create a space where conduits may be run between said pillars upon a sub-floor or on a tray above said sub floor. These systems can be very labor intensive to build and furthermore the space created between the floors is substantially wide open, creating the need to install additional duct work or piping and devising or providing a means of support for said duct work or piping to allow for the separation of the various utilities residing within said systems.

As a result of such difficulties, other systems have been developed in an attempt to reduce the number of different pieces that must be assembled on site in order to speed installation and ease manufacture. U.S. Pat. Nos. 5,074,085 to Ueda (1990) and 4,996,810 to Forde (1991) are two examples of this type of simplified modular access floor system. Such systems generally are constructed of arrays of interchangeable like units that limit the passage of wiring and utilities along a single plane between a top floor and a sub floor. Such panels tend to create an undesirable situation where various different types of wiring and utilities are required to overly each other and to be in close proximity or touching each other as they travel along the various passages included in such simplified modular access floor systems.

In addition, there are many access floor systems formed of metal raceways and metal access boxes designed to be used in conjunction with cement which is poured over said system after installation. U.S. Pat. Nos. 4140,791 to Kimbrough (1992) and U.S. Pat. No. 4,594,826 to Gray (1986) are typical examples of such methods. The difficulty of making changes to the layout of said access boxes after the aforementioned cement is poured and the weight of such metal raceways and said cement precludes the use of this type of system for many applications.

Finally, in the United States and abroad it is also current practice to build floor heating systems by utilizing modular, prefabricated, interconnecting, support panels. Such panels, as shown in U.S. Pat. No. 4,326,366 to Werner (1979) are used to support a floor or panels upon which a floor is laid and to allow the passage of tubing within which is carried warm or hot water. Such panels are generally formed to allow the passage of tubing only along the top or bottom surface of the panel. In addition, such panels are formed so as to prevent the passage of other objects such as wires and cables and to preclude the installation of objects such as valves, sensors, and controls.

Thus, while there are many different ways to provide utilities between a floor and sub floor, most systems do not meet all of the necessary requirements of simple design, easy installation, separation of utilities, easy access, and a means of leveling.

DISCUSSION OF PRIOR ART

The inventor is aware of only one embodiment that meets most of the requirements mentioned above. This known embodiment is shown in U.S. Pat. No. 5,263,289 to Boyd (1992) and is illustrated in FIG. 1. This modular access floor panel is characterized by longitudinal ducts that pass along the surface of said panel and communicate with other lower longitudinal ducts through vertical ducts adjacent to their imperforate lower surfaces. While allowing for the separate passage of the various utilities, said panels do not fully enclose the longitudinal ducts and in the case of an uneven sub-floor or top floor surface, wires that are pulled through said ducts may become pinched or trapped by the undulations of the aforementioned top floor or sub floor. In addition, such a modular access floor system, while optionally providing for a means of interlocking at the edges or sides of such panels, has no provision for interlocking the panels when they are stacked vertically, which may cause such panels to become misaligned or jostled about before or during top floor installation. Furthermore, when passing wires through such panels, one is required to make use of differing planes when a change in the direction of said wire is desired. In order to accomplish this aforementioned task, access from the top floor must be provided at every vertical duct where it is desired to change the direction of the wiring or one must attempt to get a wiring tape or fish to pass into the correct vertical duct from the nearest access point. This can be a frustrating and time consuming process when substantial changes are made to the wiring configuration of an office or other space and the desired locations for changes were not provided with access during initial installation. Also, these panels do not provide for easy access to multiple utilities, such as an outlet box that provides telecom, power, and data connections in one location, unless the utilities are in adjacent ducts. Finally, though there is a means of compensating for undulations in the sub floor by use of a tray, and other means to provide for smaller feeder ducts, these means require the use of additional separate pieces and defeat the purpose of having a one piece modular panel.

Thus, a need has arisen for a modular access floor system consisting of an array of modular panels that provide a means for the easy installation and rerouting of various utilities in separated ducts or channels. These panels should be lightweight and easily assembled. Additionally, these panels should provide a means for interlocking in both the vertical and horizontal direction to provide a rigid stable platform when installed in a two or three dimensional array. Furthermore, these panels should provide a series of easily accessible vertical ducts or service wells to allow wiring or utilities at different levels to be easily serviced or moved about as desired and to allow for the installation and service of equipment such as valves, sensors, controls, fans, telecom equipment, and other such equipment that may be installed in the service wells. These service wells should be designed to allow different utilities to be accessed as desired, while still providing a means for the separation of such utilities to prevent interference, flooding, fire, and other hazards, and to meet various code requirements. Finally, the modular access floor panels should provide an integral means for the individual vertical adjustment of said panels to create a flat level surface to facilitate the installation of a top or finished floor.

Thus, with the demands placed on modern building construction, especially by the medical care and computer networking communities, an urgent need has arisen for an improved, easy to design, install and modify access floor system that will provide for the separation of various types of wiring and other utilities while at the same time supplying easy routing of such utilities in a manner that will keep them physically separated yet readily available throughout a building or structure. This is especially true in medical facilities, pharmaceutical laboratories, and research centers where various gasses and liquids must be distributed along with increasingly complex power, communications, control and monitoring networks. In addition, there is an urgent need to be able to distribute controls, network routers, valves, switches and other similar decentralized facilities throughout the floor of a structure in order to reduce the material and space requirements of such facilities when they are centrally located in a control or distribution room, as is present practice. Also, there is a continuing need to have such a modular system designed in an interlocking fashion so that it will be difficult for such modules to be installed incorrectly or in an unusable or unstable manner when installed by unskilled or semi-skilled workers. Finally, in some applications, there is a need for such modular access floors to be easily adjustable in height after installation in order to create either a level surface or a surface with a predetermined drainage pattern as may be necessary in a hospital operating room or in an automotive repair facility or other similar location where drainage is a consideration.

SUMMARY OF THE INVENTION

The foregoing and other objects and advantages are achieved by my invention of a modular floor access panel having an interlocking structure to insure secure attachment to adjacent panels, at least one fully enclosed access channel, and a vertically extending service well. Optionally, a leveling mechanism and a means of attachment to a sub floor or floor may be provided. With these features, the preferred modular panel generally contains a duct or series of ducts or channels to allow the passage or residence of wires, pipes, and various other utilities, as well as a vertical duct or service well or series of wells in order to allow access to the various channels and the utilities passing through the panel, to create a space for the distribution of decentralized facilities such as network routers, switches, valves, sensors and other like equipment. The panels may be laid out in an extended array of two dimensions (or three dimensions by stacking), which will allow distribution of all utilities that may be needed throughout the floor of a building or structure in a preformed modular fashion, which will simplify design, ease manufacture, and speed installation of utilities and decentralized facilities. In addition, such an array of panels will also decentralize the control and monitoring of such utilities by receiving and housing sensors, valves, switches, routers and other decentralized facilities within the floor, thereby reducing or eliminating the present need for central switching or control rooms and the space and materials such rooms require. For example, a series of standardized panels could be designed whose dimensions and capabilities could be incorporated into a computer aided design (CAD) program. An architect or design engineer would then devise the layout of the utilities by choosing from among the set of standardized modular panels or alternatively the designer could lay out the utilities and the CAD program could then choose which panels would be used in the various locations in the building. A properly designed CAD program also could alert the designer to any conflicts in the utility layout. The number and type of panels would then be calculated and sent to the manufacturer who would then fabricate the panels of plastic from a set of standardized molds and deliver them to the job site. Using a layout schematic from the CAD program, installation of the panels would then be accomplished by simply laying out the proper panel in the proper location. This could be accomplished easily by semi-skilled workers in an efficient and cost effective manner. The interlocking fashion of the panels would make it difficult to install them incorrectly and their modular configuration would make it easy to accomplish any necessary changes. After the panels are laid out, secured, and leveled, skilled tradesmen would then install their respective utilities, equipment and facilities in the channels and service wells as determined when the layout was first designed. Finished flooring then would be installed on top of the array of panels, along with any outlets and access covers that may be necessary. The simplification and standardization of design, manufacture, and installation of utilities and decentralized facilities that this invention accomplishes will vastly increase the speed and efficiency of building construction, while reducing labor and material costs significantly.

BRIEF DESCRIPTION OF THE DRAWINGS

FIGS. 3A, 3B, 3C, 3D and 3E are perspective views of parts used in the assembly of a possible modular panel formed in accordance with the present invention;

FIGS. 5A, 5B, 5C, 5D, 5E and 5F are five elevational views of possible modular panels formed in accordance with the present invention;

FIGS. 6A, 6B and 6C are three plan views of possible modular panels formed in accordance with the present invention;

FIGS. 7A, 7B, 7C and 7D are four views of possible modular panels formed in accordance with the present invention;

FIG. 14 is a partial exploded view of one possible modular panel formed in accordance with the present invention, FIGS. 15A and 15B are two partial detail views of possible channels formed in accordance with the present invention.

DETAILED DESCRIPTION OF THE PREFERRED EMBODIMENT

Figure 1:
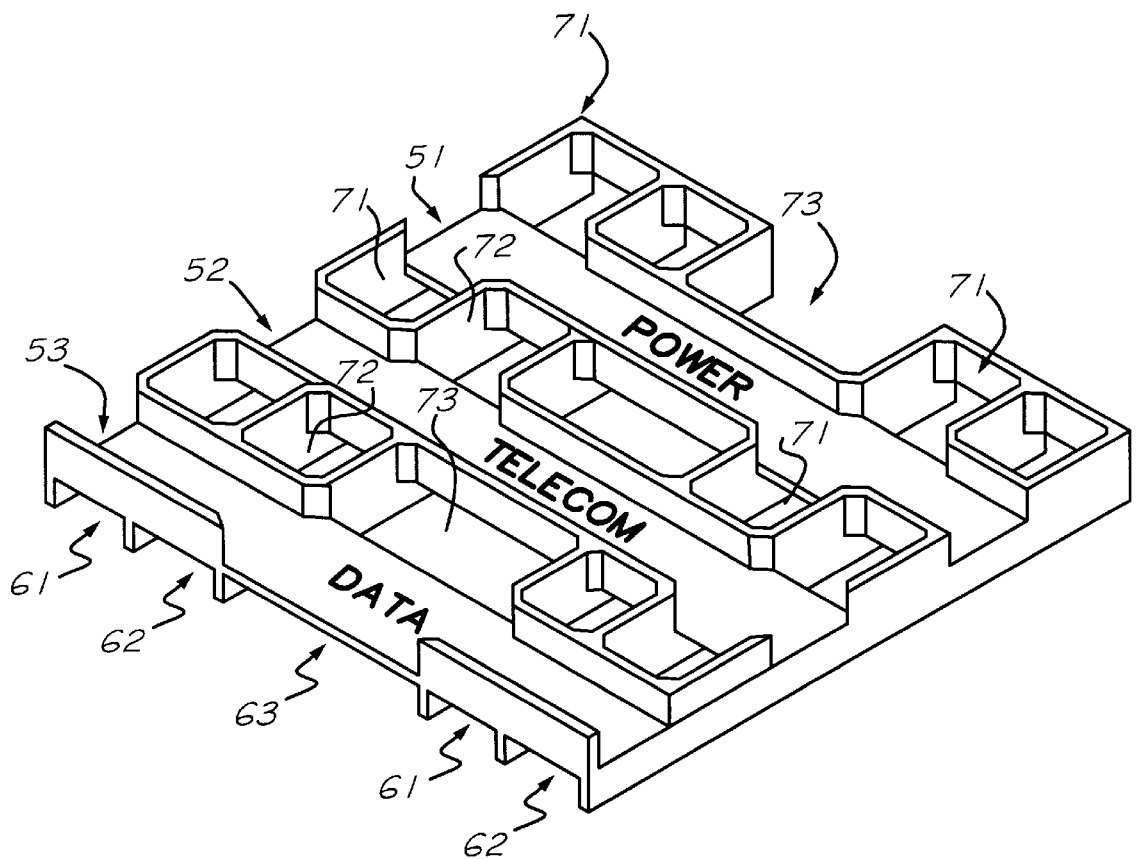
FIG. 1 is a perspective view of a prior art modular access panel.

The preferred embodiment is an interlocking panel or a series of interlocking panels formed with ducts or channels to allow the passage of various items such as wires, pipes, gasses, liquids, or other such objects or utilities inside and on the surface of such panels. Additionally, the panel may be formed so as to create a vertical duct or service well to allow for the easy installation of, access to, and rerouting of, wiring, piping and other such utilities and to facilitate the installation of various items such as valves, controls, sensors, and other like objects as required. Also, the panels should be formed so as to interlock at any surface in order to create a rigid structure. Finally, the panel may be formed so as to provide a means of vertical adjustment, preferably as an integral part of the panel, to allow a level surface to be created for the installation of a top or finished floor.

Panels

The panel outer shape determines the overall shape of the floor access system, the number of panels needed to cover the desired area, and the number of panel parts required to be manufactured. The preferred shape is rectangular or square, but other shapes may be formed. Such other shapes may be hexagonal, octagonal, round, L shaped, T shaped or any other such shape.

Panel Construction

Panels may be constructed of material such as metal, fiberglass, stone, cement, brick, composites, or other such material, though an integrally molded or stamped piece of plastic is the preferred embodiment. Stone, brick, or cement panels may be used as fire breaks or where heavy loads are expected and metal or carbon fiber panels may be used in aircraft or ships or where strength, weight, and fire resistance, are of primary consideration. The preferred embodiment is preferably formed so as to support the floor installed upon it and any activity that may be planned to take place upon the floor. For access floors, the American Society of Construction Engineers recommends a design loading requirement in the range of fifty pounds per square inch for uniform loads and two thousand pounds over a two and a half foot square for concentrated loads. The preferred panel is preferably formed as an open frame with a honeycomb or grid like internal structure where channels or service wells are not present to provide a lightweight construction with good load bearing characteristics. Panels may also be formed as solid or open construction and this type of construction may be preferred for concrete or other similar materials. Though not preferred, a panel may be formed so as to be a load bearing structural support member in a building or other structure. Other forms may be manufactured as desired and may be preferred for certain applications. Modular access floor panels may be, extruded, milled, machined, cast, or otherwise formed. In addition, it may be desirable to construct a panel of various pieces or components assembled at a factory and joined together in a permanent or semi-permanent fashion. Such panels may be formed with pipe, lining, conduit or other similar objects embedded in the panel to prevent fires, leaks, or other hazards; to reduce interference; and to meet building code requirements. In the example shown in FIGS. 3A to 3E, a panel is made of parts with different materials. FIGS. 3A, 3B, and 3E, are formed of plastic; FIGS. 3C–D are formed of metal pipe; and the various components are permanently joined together to create a single panel. Such components may be joined together by gluing, heating, melting, welding, brazing, screwing, nailing or other such methods; or may be formed so as to be snap-together units depending upon the composition of said components and other considerations.

Interlocking Method

Figure 2:
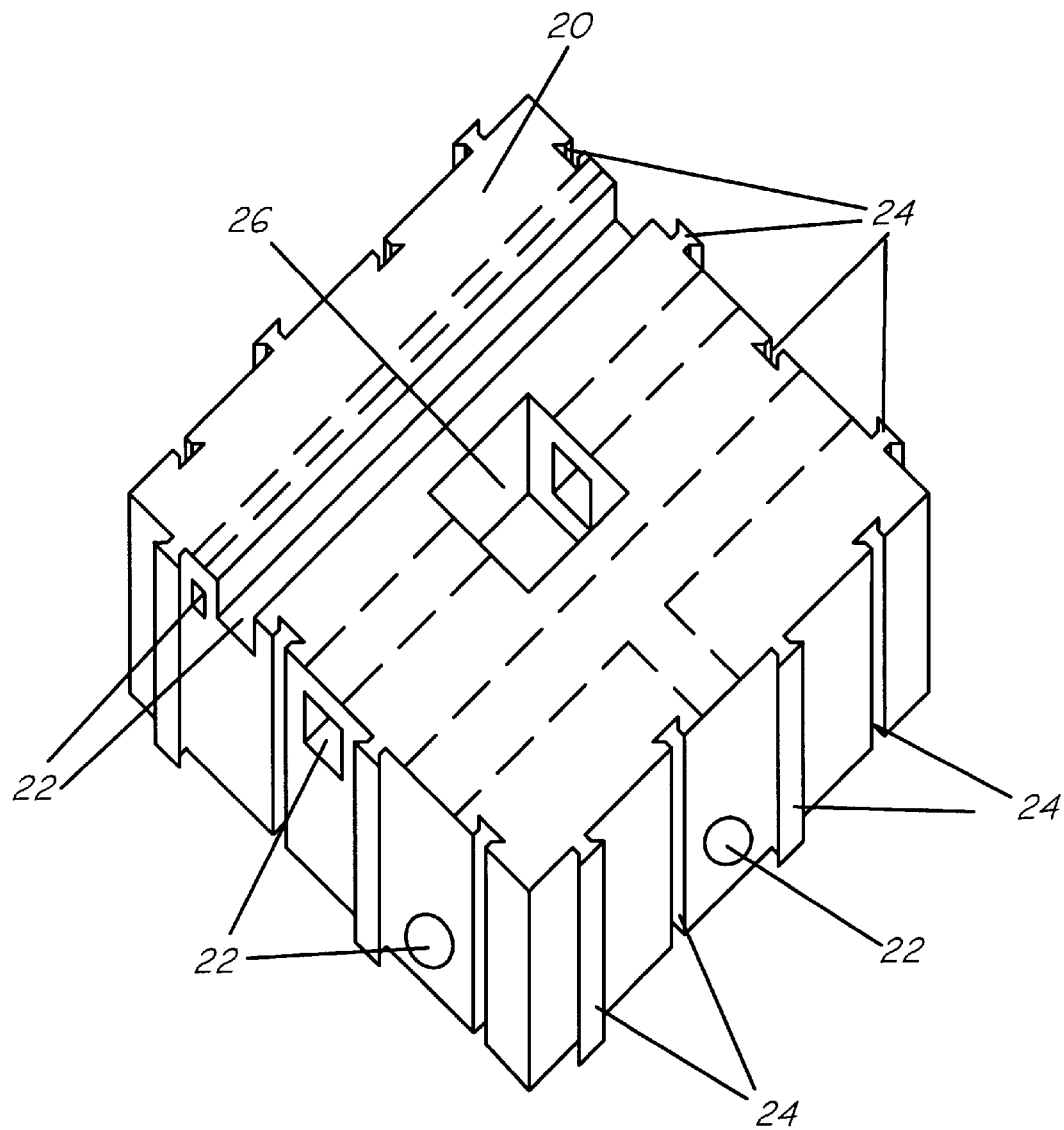
FIG. 2 is a perspective view of one embodiment of a modular panel formed in accordance with the present invention.
Figure 4A:
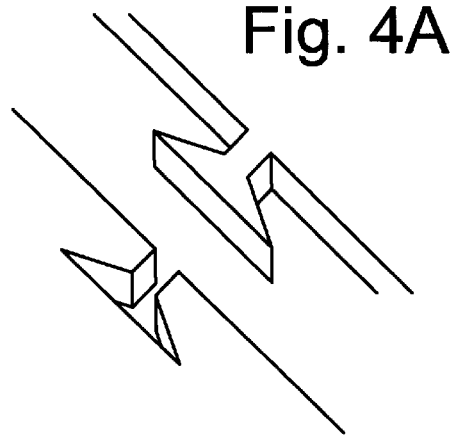
FIGS. 4A, 4B, 4C and 4D are four detailed views of some possible interlocking mechanisms for use in accordance with the present invention.
Figure 4B:
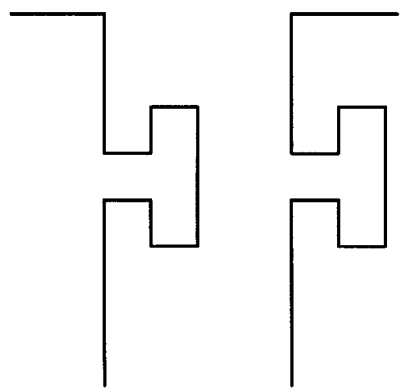
Figure 4C:
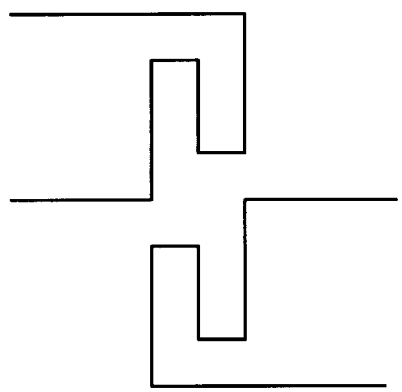
Figure 4D:
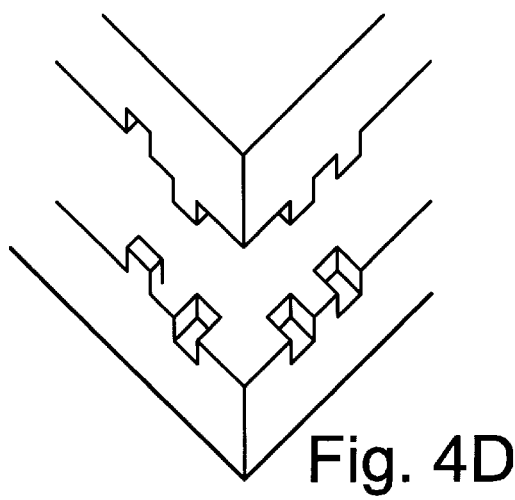

As shown in FIG. 2, the preferred embodiment preferably has interlocking shapes 24 that will hold adjoining panels together in a rigid fashion. This interlocking shape or mechanism is preferably formed as an integral part of such panels. In addition, the aforementioned panels may be formed so as to interlock in both the horizontal and vertical directions as desired. Furthermore, separate interlocking mechanisms such as keys, pins, dowels, or other such means may be used, but are not preferred as they may complicate manufacturing and installation procedures. FIGS. 4A–B are examples of some preferred interlocking arrangements for joining two panels together in a horizontal or flat configuration. FIG. 4C, while usable, is not preferred because one end of the panel is left unsupported unless joined to an adjacent panel. FIG. 4D is an example of one preferred interlocking arrangement for joining two panels together in a vertical fashion. Finally, the panels may be formed so as to be joined together in a staggered fashion to provide a more stable rigid structure. Such panels may be stacked without staggering due to other considerations, but may not provide the desired stability.

Channels

Referring to FIG. 2, a panel of the preferred embodiment 20 generally includes a channel 22 or plurality of channels formed to allow the transit or residence of various objects such as wires, cables, piping, electrical conduit, fiber optic cable, gas, liquid, or other such objects. The number, size, and shape of said channels 22 determines the number and size of pipes or wires, or the amount of gas or liquid that may be passed through such panel to a similar adjacent channel formed into an abutting panel. The preferred shapes of such channels are rectangular, round or square but any other shape such as oval, hexagonal, or L shaped, or any other such shape may be formed as required by the intended use of said channel. In addition, the channels formed in the panel may be of any number, size, or shape conformable with the size and shape of the panel and its other parts as desired. FIGS. 5A–F and FIGS. 6A–C show various paths a channel 22 may take when formed in said panel 20. Furthermore, the channels 22 may be formed so as to intersect, merge, or otherwise join together as shown in FIGS. 5D, 5F, 6A, and 6B. Additionally, channels 22 may be formed so as to begin and end at any surface of a panel and to change height or direction within such panel as illustrated in FIGS. 5B and 5E. Also, the aforementioned channel may also be formed to begin at any surface of a panel and end at any other surface of the panel, or travel at a slope to allow liquids to be moved by the force of gravity as shown in FIGS. 5B, 5C and 5D. Finally, referring to FIG. 7B, a channel 22 may terminate at a service well 26 or continue on the opposite side of said well 26, emerging at the opposite end of said panel 20 to allow items like valves and meters to be installed in pipes or wires without causing a change in direction of such item.

Service Wells

The preferred embodiment includes a chamber or service well to allow the installation of equipment such as valves, joints, sockets, outlets, computers, sensors, connection blocks, fire suppression equipment or other such objects. Referring to FIGS. 7A–D a service well 26 may be formed in a panel 20 so as to create a space or opening in said panel 20. In addition, such service well may be used to allow the installation, rerouting, or joining together of wires, pipes, or other such objects that may pass through or into said service well 26. As shown in FIGS. 7C and 7D, a preferred service well 26 should be formed so as to be rectangular, or circular in shape.

Figure 8A:
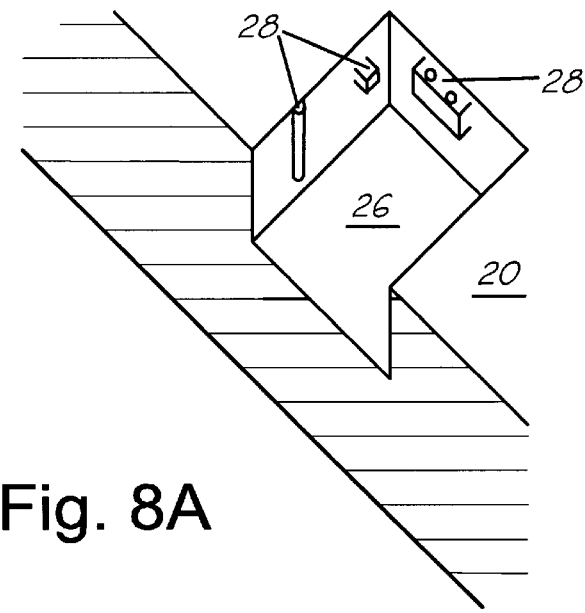
FIGS. 8A and 8B are two detailed cutaway perspective views of possible service wells formed in accordance with the present invention.

Though other shapes such as octagons, ovals, and other such shapes may be used as desired, it may be more difficult to install standard equipment such as receptacles, connection boxes, outlets, and other such equipment. Additionally, as illustrated in FIG. 7A, a service well 26 may pass all the way through a panel 20. Furthermore, the preferred position for each well is at the center of each panel to ease planning and make the service well less difficult to locate when a floor is installed on top of a panel array. At times, other locations or more than one service well may prove more beneficial and such service wells may be formed in a panel at any location or in any number as desired. Finally, referring to FIG. 8A, recesses or shapes 28 may be formed along the sides of a service well 26 to allow such standard equipment as switches, outlets, and receptacles or other equipment to be more easily installed or may be formed so as to allow a method of attaching wires, pipes, cables, clamps, or hangers for such wires, pipes, or cable.

Partitions and Covers

Figure 8B:
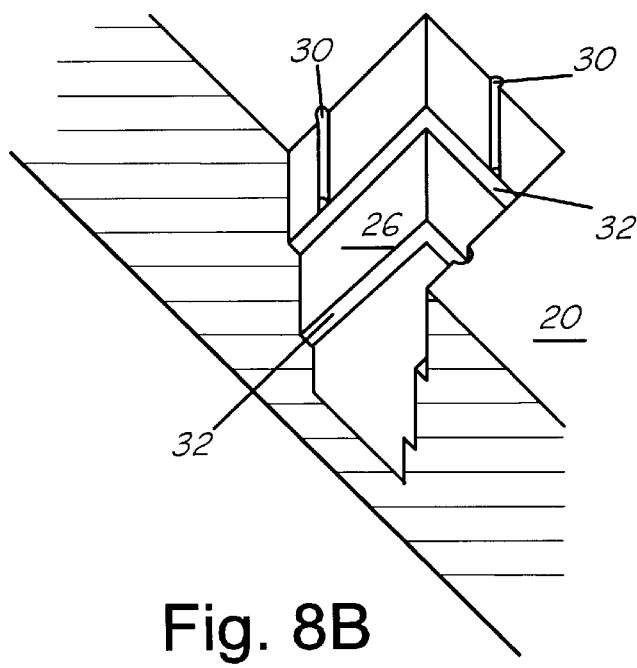
Figure 8C:
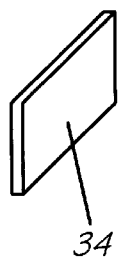
FIG. 8C is a perspective view of a possible partition or cover formed in accordance with the present invention.

As shown in FIGS. 8B and 8C a service well 26 may be formed so as to have slots 30 to hold a removable partition 34. Such a partition may be used to provide separation for different items that must be kept apart such as power wires and telephone lines while allowing such utilities to be available at the same well 26. Such partitions are preferably made of metal or metal coated to reduce the chance of interference or crosstalk in the wiring, but may be made of plastic or any other material as desired, or may be plastic coated to reduce the possibility of short circuits, grounding, and other similar hazards. Furthermore, referring to FIGS. 8B and 8C, a panel may have a service well 26 that may be formed so as to have a step 32 or a series of steps at some height above the bottom of said well 26 so that a horizontal partition or cover 34 or series of covers may be laid in or on the aforementioned well 26 to provide a floor for the installation of various equipment such as valves, switches, sensors and other like equipment and to facilitate the separation of different utilities while still allowing access to the lower levels of said service well 26 and to service wells that may be situated in other panels lying below such panel. Such partitions and covers as shown in FIG. 8C may be formed so as to be of any type and size suitable to meet the various needs and requirements of the design or use of a panel and any service well or wells that may be formed into said panel.

Modular Panel Array

Figure 9:
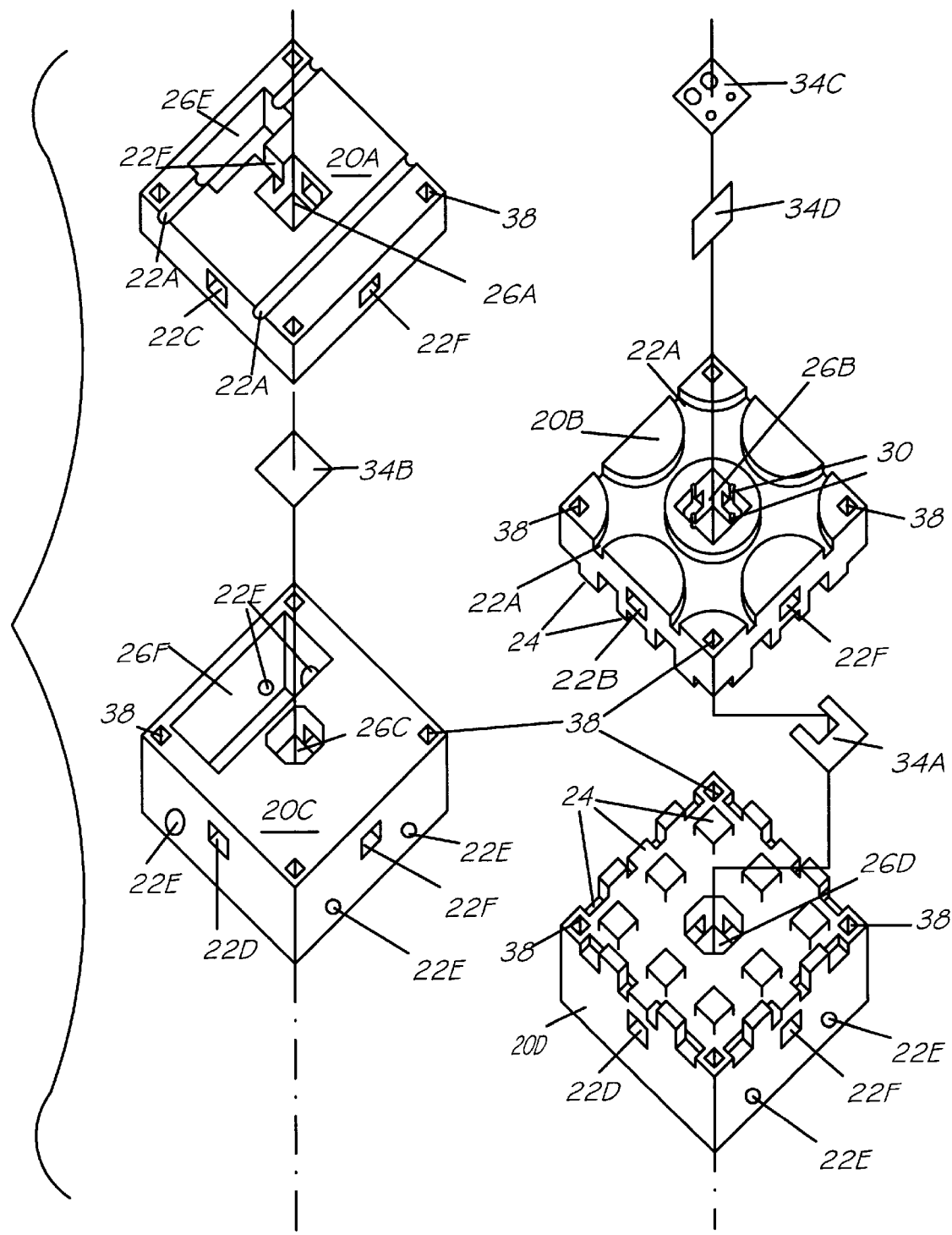
FIG. 9 is an exploded perspective view of an array of modular panels formed in accordance with the present invention.

FIG. 9 illustrates an exploded view of one example of a possible preferred embodiment consisting of an array of four panels with covers and a partition panel forming a 2×1 unit array that is 2 units deep. While there are only four panels shown in FIG. 9, it will be appreciated that said illustration is only a small portion of a possible installation of an array of panels and is shown to provide illustration and further understanding of some details of the invention and its intended uses. These details include:

a. a view of one possible vertical interlocking members 24 formed in two panels 20B and 20D which show a partial illustration of such method at their respective faces where the panels would be joined together, b. views of some possible channels formed to allow the passage of various utilities including: tubing guide channels 22A formed on the surface of the upper panels 20A and 20B to carry hydronic tubing for a floor heating and cooling system with the tubing channels 22A in one panel 20B formed to allow the tubing to change direction as needed; communications channels 22B formed in the interior of the same upper panel 20B and intended for the use of telecom wiring or computer networking cables; the other upper panel 20A is formed with control channels 22C in its interior to carry control and sensor wiring for the aforementioned heating and cooling system and other utilities; both lower panels 20C and 20D are equipped with power channels 22D for electrical power wiring and piping channels 22E for water supply piping, the power channels 22D pass through the lower panels 20C and 20D above the piping channels to allow both utilities to be distributed throughout the array of panels without conflict or interference, and in all the panels 20A–D cross-channels 22F to connect the service wells 26;

c. views of some possible service wells to provide access to the various utilities passing through the illustrated panels including: a control service well 26A formed in one panel 22A so as to allow access to control and sensor wiring passing through the control channels 22C connected to said service well 26A; additionally, said service well 26A is formed with a side channel 22F to allow wiring to pass into the tubing service well 26E and to the panel below 20C and the piping service well 26F formed into said panel 20C; such tubing service well 26E and piping service well 26F may be used to install sensors or valves, and in the case of the piping service well 26F, to connect pipes together that may pass into said well through the various piping channels 22E formed into the panel 20C; the other upper panel 20B contains an access service well 26B to allow access to telecommunications or computer networking cables passing into said well by way of the communications channels 22B; said access service well 26B also allows access to its corresponding lower panel's 20D power service well 26D and any power wiring that may pass into or through said well; the other lower panel 20C has, in addition to its piping service well 26F, a separate power service well 26C that is connected to its own power channels 22D, to the service well 26D in the adjacent panel 20D through a cross-channel 22F, and to the service well 26A in the panel above 20A; said service well 26C is not connected directly to the piping service well 26F to prevent any water leaking into said well 26F from coming into contact with the aforementioned power wiring in the adjacent service well 26C and creating any kind of hazardous situation caused by the mixing of water and electricity, d. illustrations of two possible covers 34A and 34B made of thin metal sheeting which are installed through the respective upper panels 20A and 20B onto service wells 26C and 26D and are used to separate utilities while still allowing access to the lower panels' 20C and 20D respective service wells 26C and 26D; in addition, one cover 34A has a cut out to allow electrical power wiring to be passed into the upper panel 20B service well 26B and at the same time keep the aforementioned power and communications utilities physically separated as used in conjunction with the partition 34D, e. an example of one possible partition 34D also made of thin sheet metal, as installed in the upper panel 20B in the slots 30 formed into the sides of the service well 26B to allow power wiring from a lower panel 20D service well 26D to be connected to the outlet cover 34C without coming into physical contact with or creating interference in the communications wiring in the upper panel 20B service well 26B, f. views of possible adjustment access holes 38 formed at the top corners of each panel to allow a leveling system (not shown) to be adjusted.

Leveling System

Figure 10:
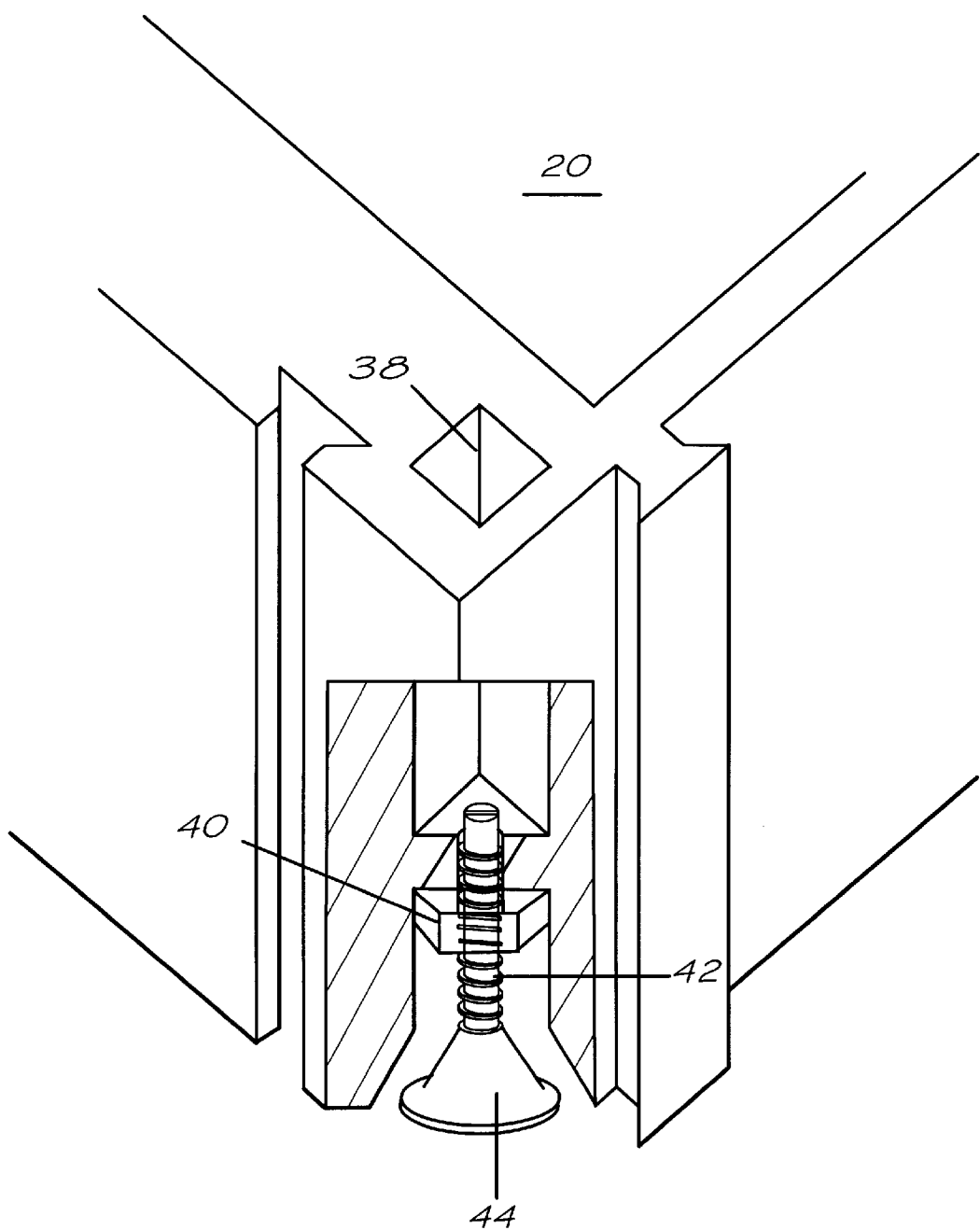
FIG. 10 is a detailed cutaway view of a possible leveling system formed in accordance with the present invention, as indicated by A in FIG. 12.

FIG. 10 is a partial cutaway view of a corner of one possible panel illustrating one preferred method of integrating a leveling system into a panel. The panel 20 has a shape formed in it near a corner to provide a place for the installation of a captive nut 40. The nut 40 is held firmly in place by forming the panel 20 in such a manner as to create a very tight fit. A screw 42 is threaded through said nut 40 and has a foot 44 attached to its lower end. By turning said screw 40, said foot 44 may be moved up or down as desired to adjust the level of the shown corner of said panel 20. Such leveling system, when used in conjunction with other like units installed in the corners of each panel in an array of panels, may be adjusted together to reduce the unevenness of the sub floor and create a level surface for the installation of a top floor. Additionally, a leveling system foot may have a rubber or felt pad attached to the bottom of said foot to reduce noise transmission and absorb shock. Such level adjusting means may be formed at any place and in any number in a panel as desired or required by loading and other considerations. Other systems for leveling such as shims, jacks, and levers may be used as desired but are not preferred.

Method of Attachment

Figure 11:
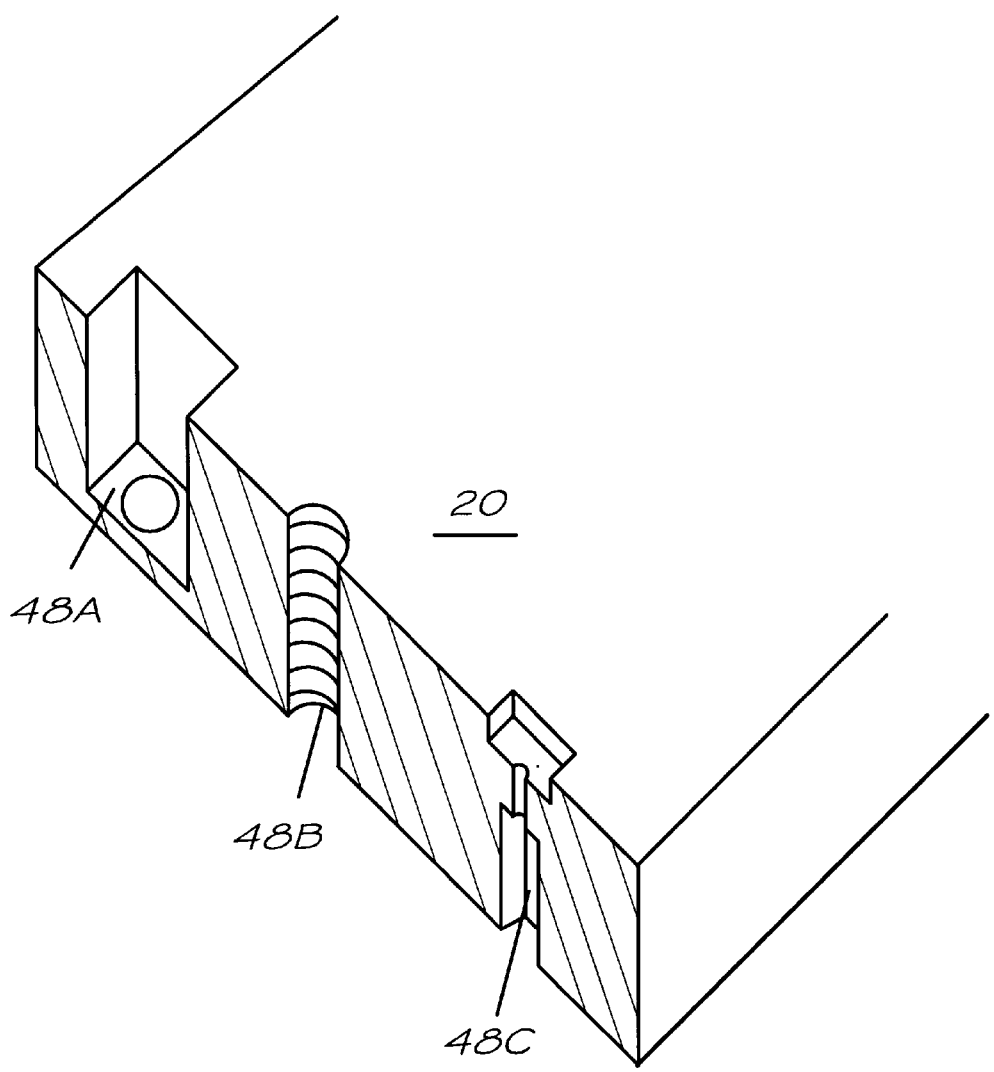
FIG. 11 is a detailed cutaway perspective view of some possible attachment schemes formed in accordance with the present invention.

A means of securing a panel to a sub floor or top floor may be provided by forming shapes in said panel to allow bolts, screws, studs, or other means to be used to attach said panel to a sub floor or to attach said top floor to the aforementioned panel. Such means may be necessary where a floor may be subject to being upset, as when installed aboard a ship, or in an area where earthquakes are expected. FIG. 11 provides a detailed view of some preferred means of attachment. An attachment hole 48A is formed into a panel 20 through which a bolt or screw may be passed to be attached to the sub floor below. Alternatively, a threaded attachment hole 48B may be formed into said panel 20 to receive a bolt from either floor or an attachment hole 48C may be formed so as to hold a captive nut and to receive a bolt from the floor above. Such shapes and any other such shapes may be formed as and where desired in a panel to provide the holding power required by the various applications a panel may be used in.

Figure 12:
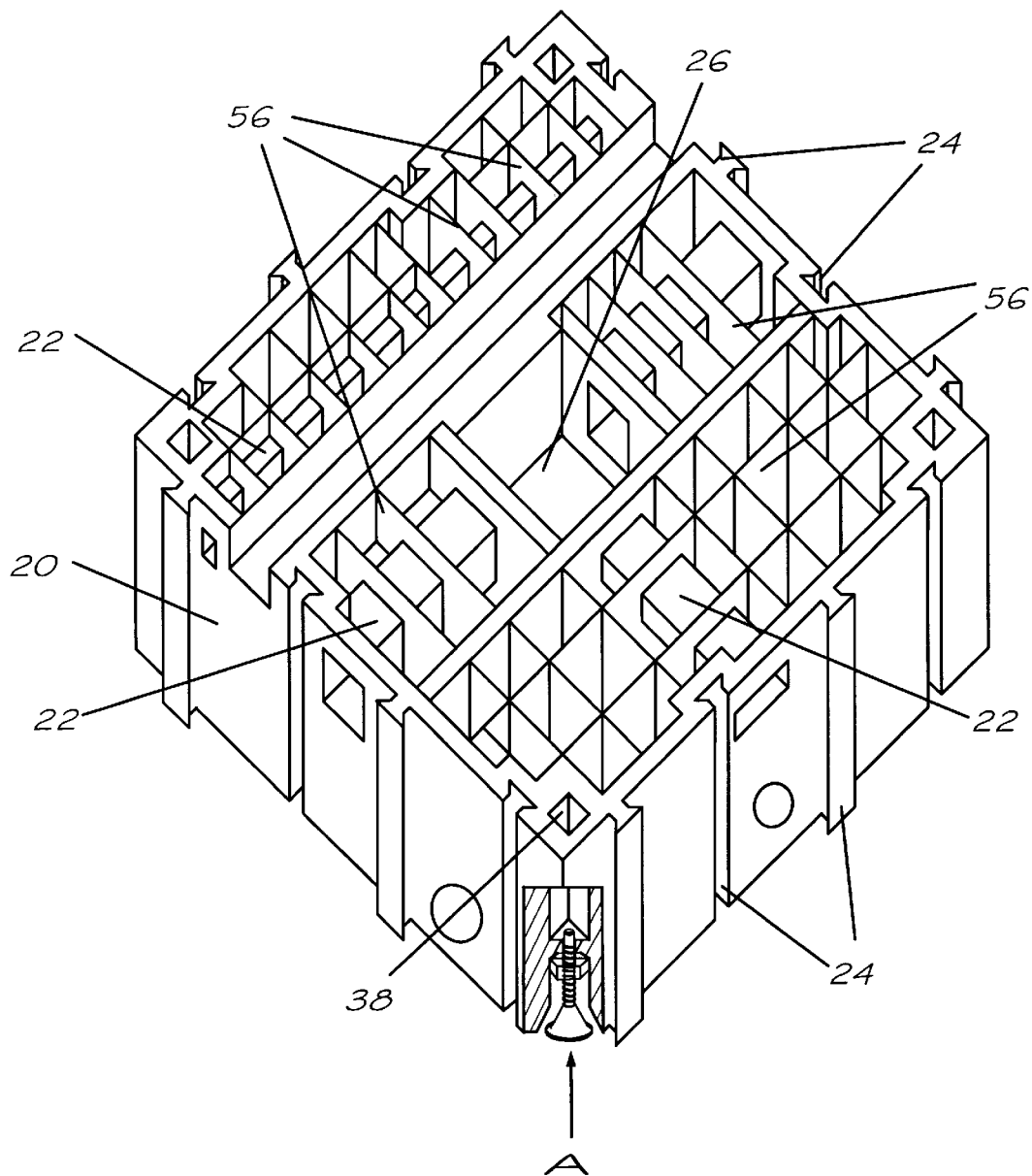
FIG. 12 is a perspective view of one possible modular panel formed in accordance with the present invention.

FIG. 12 is an illustration of one preferred panel and is shown to provide further understanding of some details of the invention as explained above. A panel 20 is formed of plastic as a grid of plates 56 to provide a lightweight structure and to support various channels 22 and a service well 26 residing in said panel. The aforementioned panel 20 also shows one possible interlocking means 24 formed on all four sides of said panel 20 and indicates at A a possible leveling system with a level adjustment hole 38 shown in proper perspective. A detailed cutaway view of the leveling system is shown in FIG. 10 and described above.

Method of Reinforcement

Figure 13A:
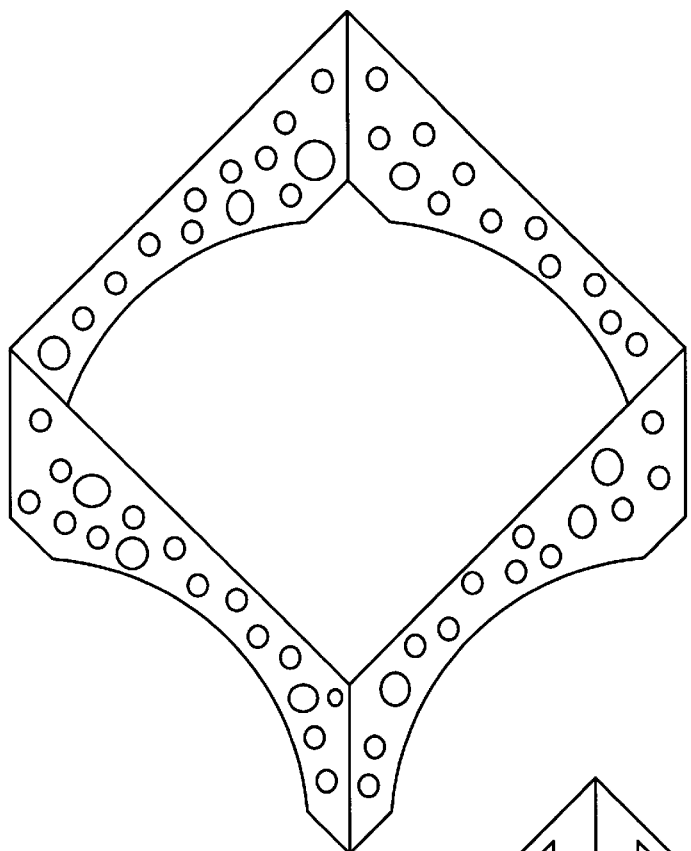
FIGS. 13a and 13b are two perspective views of possible reinforcing frames for a panel formed in accordance with the present invention.
Figure 13B:
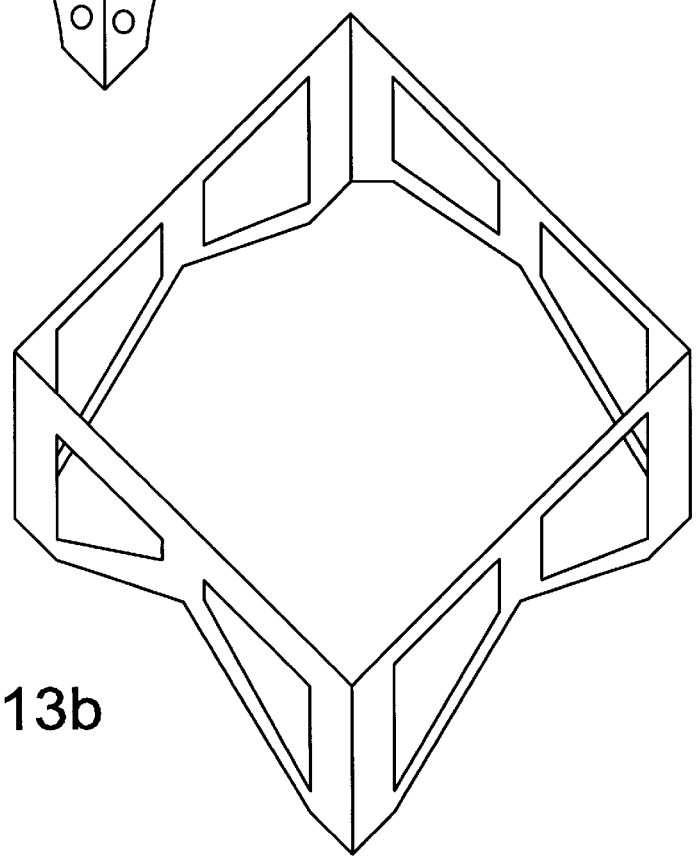

A panel, when formed entirely of plastic or some other like material, may not be strong enough to support a load imposed upon it by a top floor, or by any equipment placed upon said floor, or by any activities that may take place upon such floor, or may not be able to be formed in such a manner as to prevent failure of a leveling system due to the nature of the plastic or other such lightweight material. In such a case, a method of reinforcing the panel may be formed into the panel. Such method may take the form of a frame which may be placed in a plastic mold before the molding process takes place and by being formed in such manner, be entirely encased in said plastic to create a stronger, more rigid panel. Two preferred forms of reinforcing frames (preferably metal) are shown in FIGS. 13a–b. FIG. 13a illustrates one possible preferred reinforcing frame formed of sheet metal with perforated sides to allow the plastic to mold itself through the metal framework and with arches to provide strength to the span of the sides while still allowing access to channels formed into the sides of the panel into which the frame may be incorporated. FIG. 13b shows one possible open frame style of construction that may be formed of metal plates or posts and beams or a combination of said plates, posts, and beams or may be stamped or pressed from a sheet of metal. The open frame in FIG. 13b is formed so as to create a cantilevered construction to support the span of the side walls with the open frame leaving space between its members so said plastic may form through such frame during the aforementioned molding process. Alternatively, the reinforcing means may be formed so as to be attached to such panel after molding or may be formed so as to be only partially encased by the plastic, but this may complicate manufacture and assembly of the panels and may expose a metal reinforcing frame to corrosion, rust, and other similar agents of deterioration. Carbon fiber, composites, or any other such material which will provide adequate strengthening may also be used in the manufacture of such reinforcing frames and other designs or forms may be used as desired.

Alternate Method of Construction

In order to ease the manufacture of a modular panel when such panel may be formed of plastic by injection molding, or stamping, or when other methods or materials lend themselves to the process, it may be preferred to make preformed channels that may be inserted into such panels after the panel structure is formed by the use of a further assembly process. Such assembly process may be as simple as inserting such preformed channels into their respective places in said panels. This alternative construction method may be preferred where differing materials are required for channels such as when there is a requirement for such channels to be lined with or manufactured of metal or other such expensive or weighty materials to prevent the emission of harmful radiation or the leaking of caustic or other environmentally hazardous materials. FIG. 14 is a partial view of one such possible plastic modular panel formed by injection molding which, together with the following, provides an outline of how said process may be accomplished. A fully enclosed preformed channel 22G is separately formed and may be inserted into the middle portion of the panel 20 through the openings 52A formed into said panel as indicated by the dashed lines leading from said channel 22G to the aforementioned panel 20. Another type of preformed channel is a partially enclosed preformed channel 22H which is made to be inserted onto the opening 52B as indicated by the dashed lines leading from said partial channel 22H to said corresponding partial channel located at the bottom of said panel 20. In addition, when using the preformed channels, a means must be provided to secure such channels in said panel so that they are not dislodged or become misaligned. FIG. 15A shows a partial detail view of the end of one possible preformed fully enclosed channel 22G with a straight wedge shape 54A formed near the end of said channel 22G. Alternatively, a partially rounded wedge shape 54B may be used to provide some degree of protection against the slippage and backsliding of said channel when inserted into a panel. Furthermore, it is preferred that such shapes or other similar shapes be formed near both ends of such channels and face in opposing directions in order to hold said channel rigidly in place when butted up against an interior wall or shape formed into said panel. Also, such shapes may be formed at any other place on said channel where such shapes may be firmly in contact with a part of a panel that may provide them with the purchase necessary to hold such channels firmly in place. FIG. 15B is a partial detail view of one possible preformed partially enclosed channel illustrating one preferred method of securing such channel to a panel. The channel 22H is formed with rounded protrusions or bumps 54C along the sides walls of said channel which bumps would, when the channel is inserted into a matching place formed for such channel in a panel, lodge firmly into corresponding intrusions or dimples formed into the side walls of said matching partial channel, thus holding said channel rigidly in place. Other shapes and other methods of securing such channels to a panel may be used including screwing, gluing, welding or any other such method but are not preferred as such methods may not be as simple and may require the use of tools or machinery thus causing increased production costs.

Conclusion

As will be appreciated from a reading of the above, the present invention provides an opportunity to manufacture and install a complete, low cost, interlocking, modular, system that will provide for all plumbing, electrical, communications, control, heating, air conditioning, ventilation, monitoring, and other needs, in a prefabricated, easy to install, service, and repair, way. While a presently preferred embodiment of the invention has been illustrated and described, it will be appreciated that there may be other embodiments which may fall within the spirit and scope of the invention as defined by the claims. Accordingly, no limitations are to be implied or inferred except as may be specifically and explicitly stated in the claims.

What is claimed is:

1. A device, comprising:
   a modular floor panel having a top surface and a periphery, at least one fully enclosed access channel extending through said modular floor panel, and a service well extending downward from said top surface and intersecting with said access channel, further comprising an interlocking structure mounted on said periphery to effect secure attachment of said modular floor panel to horizontally adjacent panels and to vertically adjacent panels to form a stable multiple layer array.

2. A device according to claim 1, further comprising:
   a leveling mechanism attached to said modular floor panel.

3. A device according to claim 1, wherein said modular floor panel comprises a material selected from the group consisting of plastic, fiberglass, carbon fiber, aluminum, and composites.

4. A device according to claim 1, wherein said interlocking structure is integrally formed with said modular floor panel.

5. A device according to claim 1, wherein said service well includes steps adapted to retain partitions.

6. A device according to claim 1, wherein said service well is provided with steps configured to receive decentralized facilities.

7. A device according to claim 1, wherein said service well of said modular floor panel extends through said modular floor panel and can be aligned with a corresponding service well of a vertically adjacent second pane when said modular floor panel is attached to said vertically adjacent second panel by said interlocking structure, whereby said corresponding service well of said vertically adjacent second panel can be accessed through said service well of said modular floor panel.

8. A device according to claim 1, wherein said service well of said modular floor panel is positioned at approximately the center of said modular floor panel.

9. A device according to claim 1, wherein said service well has a shape selected from the group consisting of rectangular, circular, octagonal, and oval shapes.

10. A device according to claim 1, wherein said access channel of said modular floor panel can be aligned with a corresponding access channel of a horizontally adjacent second panel when said modular floor panel is attached to said horizontally adjacent second panel by said interlocking structure, whereby said corresponding access channel of said second panel can be accessed through said access channel of said modular floor panel.

11. A device, comprising:
   a modular floor panel having a top surface and a periphery, having a least one fully enclosed access channel extending entirely through said modular floor panel, and having a service well extending downward from said top surface at least partly through said modular floor panel and intersecting with said access channel;
   a horizontal attachment interlocking structure mounted on said modular floor panel to attach said modular floor panel to at least one horizontally adjacent panel;
      whereby when said modular floor panel is attached to a horizontally adjacent panel having a corresponding access channel by said horizontal attachment interlocking structure, said access channel of said modular floor panel can be aligned with said corresponding access channel of said horizontally adjacent panel, whereby said corresponding access channel of said horizontally adjacent panel and said corresponding access channel of said modular floor panel form a continuous access channel;
   a vertical attachment interlocking structure mounted on said modular floor panel to attach said modular floor panel to at least one vertically adjacent panel;
      whereby when said modular floor panel is attached to a vertically adjacent panel having a corresponding service well by said vertical attachment interlocking structure, said service well of said modular floor panel can be aligned with said corresponding service well of said vertically adjacent panel, whereby said corresponding service well of said vertically adjacent panel can be accessed through said service well of said modular floor panel; and
   whereby engaging said vertical attachment interlocking structure of said modular floor panel to attach said modular floor panel to at least one vertically adjacent panel having a corresponding service well and engaging said horizontal attachment interlocking structure of said modular floor panel to attach said modular floor panel to at least one horizontally adjacent panel having a corresponding access channel creates a stable array of panels comprising a top level and at least one lower level, with at least one access channel of one of said panels in one of said levels aligned with a corresponding access channel of a horizontally adjacent panel in the same level to form a continuous access channel, and with at least one service well so one of said panels in said top level aligned with a corresponding service well of a vertically adjacent panel in one of said lower levels to allow access to said corresponding service well through said service well in said panel in said top level; and a leveling mechanism attached lo said modular floor panel.

12. A device according to claim 11, wherein said interlocking structure is integrally formed with said periphery.

13. A device according to claim 11, wherein said service well includes steps adapted to retain partitions.

14. A device according to claim 11, wherein said modular floor panel comprises a material selected from the group consisting of plastic, fiberglass, carbon fiber, aluminum, and composites.

15. A device according to claim 11, wherein said interlocking structures comprise integrally formed interlocking shapes.

16. A device according to claim 11, wherein said service well has a shape selected from the group consisting of rectangular and circular.

17. A device, comprising:

a modular floor panel having a top surface and a periphery, having at least one fully enclosed access channel extending entirely through said modular floor panel, and having a service well extending downward from approximately the center of said top surface at least partly through said modular floor panel and intersecting with said access channel;

a horizontal attachment interlocking shape at said periphery of said modular floor panel and integrally formed with said modular floor panel to attach said modular floor panel to at least one horizontally adjacent panel; whereby when said modular floor panel is attached to a horizontally adjacent panel having a corresponding access channel by said horizontal attachment interlocking shape, said access channel of said modular floor panel can be aligned with said corresponding access channel of said horizontally adjacent panel, whereby said corresponding access channel of said horizontally adjacent panel and said corresponding access channel of said modular floor panel form a continuous access channel;

a vertical attachment interlocking shape integrally formed with said modular floor panel to attach said modular floor panel to at least one vertically adjacent panel; whereby when said modular floor panel is attached to a vertically adjacent panel having a corresponding service well by said vertical attachment interlocking shape, said service well of said modular floor panel can be aligned with said corresponding service well of said vertically adjacent panel, whereby said corresponding service well of said vertically adjacent panel can be accessed through said service well of said modular floor panel; and whereby engaging said vertical attachment interlocking shape of said modular floor panel to attach said modular floor panel to at least one vertically adjacent panel having a corresponding service well and engaging said horizontal attachment interlocking shape of said modular floor panel to attach said modular floor panel to at least one horizontally adjacent panel having a corresponding access channel creates a stable array of panels comprising a top level and at least one lower level, with at least one access channel of one of said panels in one of said levels aligned with a corresponding access channel of a horizontally adjacent panel in the same level to form a continuous access channel, and with at least one service well of one of said panels in said top level aligned with a corresponding service well of a vertically adjacent panel in one of said lower levels to allow access to said corresponding service well through said service well in said panel in said top level; and a leveling mechanism attached to said modular floor panel.

18. A device according to claim 17, wherein said modular floor panel comprises a material selected from the group consisting of plastic, fiberglass, carbon fiber, aluminum, and composites.

* * * * *